(12) United States Patent
Hall et al.

(10) Patent No.: US 11,192,048 B2
(45) Date of Patent: Dec. 7, 2021

(54) METHOD AND SYSTEM FOR BATCH MULTI-EFFECT DISTILLATION

(71) Applicant: Hall Labs LLC, Provo, UT (US)

(72) Inventors: David R Hall, Provo, UT (US); Michael Hall, Provo, UT (US); Miguel Lazaro, Provo, UT (US); Jacob Dean, Provo, UT (US); Chandler Flinders, Orem, UT (US); Keylan Jensen, Provo, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/805,726

(22) Filed: Feb. 29, 2020

(65) Prior Publication Data
US 2021/0268399 A1    Sep. 2, 2021

(51) Int. Cl.
| | |
|---|---|
| *B01D 3/14* | (2006.01) |
| *C02F 1/04* | (2006.01) |
| *B01D 1/00* | (2006.01) |
| *C02F 103/00* | (2006.01) |

(52) U.S. Cl.
CPC .......... *B01D 3/146* (2013.01); *B01D 1/0017* (2013.01); *C02F 1/04* (2013.01); *C02F 2103/002* (2013.01)

(58) Field of Classification Search
CPC .......... B01D 1/0017; B01D 3/146; C02F 1/04
See application file for complete search history.

(56) References Cited

U.S. PATENT DOCUMENTS

| | | | | |
|---|---|---|---|---|
| 3,152,053 A | * | 10/1964 | Lynam ................ | C02F 1/04 202/173 |
| 3,941,663 A | * | 3/1976 | Steinbruchel ........ | B01D 1/26 202/174 |
| 3,966,562 A | * | 6/1976 | Mukushi ............. | C02F 1/06 202/173 |
| 4,330,373 A | * | 5/1982 | Liu .................... | B01D 3/065 202/174 |
| 4,376,679 A | * | 3/1983 | Liu .................... | C02F 1/14 203/71 |
| 4,906,337 A | * | 3/1990 | Palmer ............... | C02F 1/16 126/362.1 |
| 7,251,944 B2 | * | 8/2007 | Holtzapple ......... | B01D 1/0058 62/333 |
| 7,799,178 B2 | * | 9/2010 | Eddington .......... | B01D 1/26 203/10 |
| 8,277,614 B2 | * | 10/2012 | Alhazmy ............ | B01D 1/26 202/173 |
| 8,328,995 B2 | * | 12/2012 | Eddington .......... | C02F 1/041 203/10 |

(Continued)

*Primary Examiner* — Jonathan Miller (57) ABSTRACT

Methods and systems for conducting batch multi-effect distillation are disclosed. A multi-effect distillation system and one or more isolation devices are provided. A feed stream, consisting of water and a solute, is passed from a feed source into a brine side of the plurality of heat exchangers. The feed source is isolated from the plurality of heat exchangers by closing the one or more isolation devices. A first of the plurality of heat exchangers is heated by the heat source. A steam stream and a brine concentrate stream are produced in all but a last of the plurality of heat exchangers. A condensate stream from the steam stream is produced in all but the first of the plurality of heat exchangers. A warmed feed stream is produced in the last of the plurality of heat exchangers.

18 Claims, 6 Drawing Sheets

(56) References Cited

U.S. PATENT DOCUMENTS

| | | | | |
|---|---|---|---|---|
| 9,028,653 | B2* | 5/2015 | Kwak | B01D 1/0058 |
| | | | | 202/174 |
| 9,539,522 | B1* | 1/2017 | El-Sayed | C02F 1/06 |
| 10,099,154 | B2* | 10/2018 | Zeitoun | B01D 1/26 |
| 10,457,568 | B2* | 10/2019 | Rahimi | C02F 1/06 |
| 2007/0215453 | A1* | 9/2007 | Eddington | C02F 1/16 |
| | | | | 203/10 |
| 2011/0180384 | A1* | 7/2011 | Metz | B01D 1/26 |
| | | | | 203/39 |
| 2015/0001038 | A1* | 1/2015 | Katyal | B01D 3/42 |
| | | | | 196/102 |
| 2017/0029290 | A1* | 2/2017 | Rahimi | C02F 1/16 |
| 2017/0151507 | A1* | 6/2017 | El-Sayed | B01D 61/027 |
| 2019/0352194 | A1* | 11/2019 | Thiers | C02F 1/265 |

* cited by examiner

| 501 |
|---|
| Provide a multi-effect distillation system with a heat source, a plurality of heat exchangers in series, and a feed source. |

| 502 |
|---|
| Provide one or more isolation devices between the feed source and a brine side of the plurality of heat exchangers in series. |

| 503 |
|---|
| Feed a feed stream, consisting of water and a solute, from the feed source into the brine side of the plurality of heat exchangers. |

| 504 |
|---|
| Isolate the feed source from the plurality of heat exchangers by closing the one or more isolation devices. |

| 505 |
|---|
| Heat a first of the plurality of heat exchangers by the heat source. |

| 506 |
|---|
| Produce a steam stream and a brine concentrate steam in all but a last of the plurality of heat exchangers. |

| 507 |
|---|
| Produce a condensate stream from the steam stream in all but the first of the plurality of heat exchangers. |

| 508 |
|---|
| Produce a warmed feed stream in the last of the plurality of heat exchangers. |

601
Provide a heat source and n heat exchangers in series.

602
Pass a solution, consisting of water and a solute, from a source into the brine side of the heat exchangers H1 through Hn as feed streams F1 through Fn.

603
Isolate the brine side of the heat exchangers H1 through Hn from the source.

604
Heat the heat exchangers H1 by the heat source, producing a steam stream S1 and leaving behind a brine concentrate B1.

605
Produce steam streams S1 through Sn-1 in heat exchangers H1 through Hn-1.

606
Produce condensate streams C2 through Cn in heat exchangers H2 through Hn.

607
Pass steam stream Sm-1 through the steam side of the heat exchanger Hm, condensing the steam stream Sm-1 to produce a condensate stream Cm, first heat transfer causing at least a portion of the feed stream Fm in the brine side of the heat exchanger Hm to boil and form a steam stream Sm, leaving behind a brine concentrate, Bm.

608
Pass the steam stream Sn-1 through the steam side of the heat exchanger Hn, condensing the steam stream Sn-1 to produce a condensate stream Cn, second heat transfer warming the feed stream Fn to produce a warmed feed stream.

FIG. 6

METHOD AND SYSTEM FOR BATCH MULTI-EFFECT DISTILLATION

TECHNICAL FIELD

The systems and methods described herein relate generally to separation of solvent from solutes.

BACKGROUND

People generate gray water while doing such things as showering, washing dishes, or brushing teeth. Disposal of that gray water is easy when it drains into a sewage system, such as in a typical house. However, when there is no sewage system, such as in a camping trailer or in an off-grid home, the gray water typically is stored in a tank, which needs to be emptied. Emptying a gray water tank can be time consuming and burdensome, especially if an accompanying black water tank is not yet full.

SUMMARY

In a first aspect, the disclosure provides a method for conducting batch multi-effect distillation. A multi-effect distillation system is provided consisting of a heat source, a plurality of heat exchangers in series, and a feed source. One or more isolation devices are provided between the feed source and a brine side of the plurality of heat exchangers in series. A feed stream, consisting of water and a solute, is passed from the feed source into the brine side of the plurality of heat exchangers. The feed source is isolated from the plurality of heat exchangers by closing the one or more isolation devices. A first of the plurality of heat exchangers is heated by the heat source. A steam stream and a brine concentrate stream are produced in all but a last of the plurality of heat exchangers. A condensate stream from the steam stream is produced in all but the first of the plurality of heat exchangers. A warmed feed stream is produced in the last of the plurality of heat exchangers.

In a second aspect, the disclosure provides a system for conducting batch multi-effect distillation. A multi-effect distillation system consists of a heat source, a plurality of heat exchangers in series, and a feed source. One or more isolation devices are installed between the feed source and a brine side of the plurality of heat exchangers. The feed source is configured to pass a feed stream, consisting of water and a solute, to the brine side of the plurality of heat exchangers. The one or more isolation devices are configured to isolate the feed source from the plurality of heat exchangers after the feed stream is passed. All but a last of the plurality of heat exchangers are configured to produce a brine concentrate stream and a steam stream. All but a first of the plurality of heat exchangers are configured to produce a condensate stream from the steam stream. The last of the plurality of heat exchangers is configured to produce a warmed feed stream. The heat source is configured to heat the first of the plurality of heat exchangers.

In a third aspect, the disclosure provides a method for conducting batch multi-effect distillation. A heat source and n heat exchangers are provided in series. A heat exchanger H1 is a first heat exchanger and a heat exchanger Hn is an nth heat exchanger, n representing the number of heat exchangers. Each heat exchanger H1 through Hn has a brine side and a heat side. The brine side of the heat exchanger Hm−1 is in fluid communication with the steam side of the heat exchanger Hm, m representing numbers between 2 and n−1. A solution, consisting of water and a solute, is passed from a source into the brine side of the heat exchangers H1 through Hn as feed streams F1 through Fn. The brine side of the heat exchangers H1 through Hn is isolated from the source. The heat exchanger H1 is heated by the heat source, producing a steam stream S1 and leaving behind a brine concentrate B1. Steam streams S1 through Sn−1 are produced in heat exchangers H1 through Hn−1. Condensate streams C2 through Cn are produced in heat exchangers H2 through Hn. The steam stream Sm−1 is passed through the steam side of the heat exchanger Hm, condensing the steam stream Sm−1 to produce a condensate stream Cm. The heat transfer causes at least a portion of the feed stream Fm in the brine side of the heat exchanger Hm to boil and form a steam stream Sm, leaving behind a brine concentrate Bm. The steam stream Sn−1 is passed through the steam side of the heat exchanger Hn, condensing the steam stream Sn−1 to produce a condensate stream Cn. The heat transfer warms the feed stream Fn to produce a warmed feed stream.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art.

In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "gray water" is meant to refer to the relatively clean waste water from baths, sinks, washing machines, and other kitchen appliances.

As used herein, "a batch" is meant to refer to the unit operations from passing the feed stream into the heat exchangers through producing brine concentrate and condensate. Each time the feed stream is added to the heat exchangers begins a new batch.

The small-scale waste stream producer is typically underserved in industry. Small-scale waste stream producers, including recreational vehicles, remote work sites, third-world villages, and remote cabins, typically cannot afford expensive waste treatment systems. Gray water is commonly defined as all wastewater generated in households or office buildings from streams without fecal contamination. As used herein, gray water also includes the same wastewater generated by recreational vehicles, remote work sites, villages, and remote cabins. Gray water is the most typical waste stream envisioned, but other waste streams, such as water with dissolved salts, may be treated by the methods and systems described herein. The disclosed invention, as related to recreational vehicles, can be used as part of a "Never Dump/Never Fill" philosophy for recreational vehicles. Recreational vehicle users typically dread the dumping part of recreational vehicle usage. As a part of the "Never Dump" philosophy, the inventions disclosed describe systems and methods for gray water disposal accomplished without user involvement, eliminating dumping. Even single residential dwellings may use the inventions disclosed herein successfully, eliminating the need for complex sewage transport and treatment systems for towns and cities.

Figure 1:
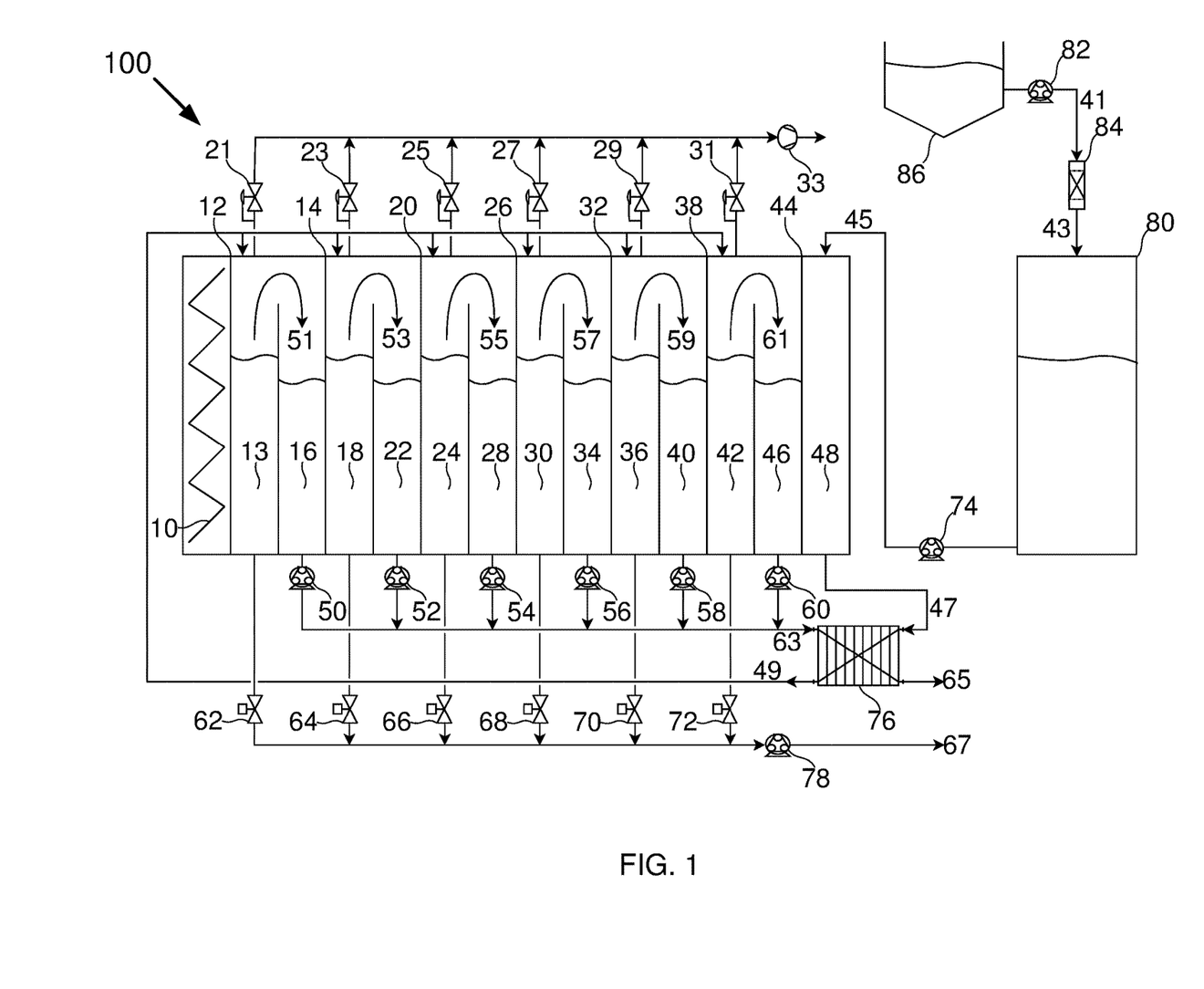
FIG. 1 is a block flow diagram showing a method for conducting batch multi-effect distillation.

FIG. 1 is a block flow diagram showing a method for conducting batch multi-effect distillation at 100 that may be used in one embodiment of the present invention. A gray water tank 86, a gray water pump 82, a solids filter 84, a feed tank 80, and a feed pump 74 are provided. A first, second, third, fourth, fifth, sixth, and seventh heat exchanger 12, 14, 20, 26, 32, 38, and 44, respectively, are provided. The first heat exchanger 12 has an electrical heating element 10 to heat brine warming chamber 13. The second through sixth heat exchangers 14, 20, 26, 32, and 38 each have steam condensing chambers 16, 22, 28, 34, 40, and 46, respectively, and brine warming chambers 18, 24, 30, 36, 42, and 48, respectively. The brine chambers 13, 18, 24, 30, 36, and 42 each have a connection to a pressure regulator 21, 23, 25, 27, 29, and 31, respectively, each connected to a vacuum pump 33. Each of the steam condensing chambers 16, 22, 28, 34, 40, and 46 have a peristaltic pump, 50, 52, 54, 56, 58, and 60, respectively, to remove condensate. An eighth heat exchanger 76 is used to preheat the feed stream 47.

A gray water stream 41, comprising water, solutes, particulates, is pumped from the gray water tank 86 by the gray water pump 82 through the solids filter 84, removing particulates over a chosen size from the gray water 41, resulting in a feed stream 43 that is passed into the feed tank 80. The chosen size depends on the size of particulates that the valves 62, 64, 66, 68, 70, and 72, the pumps 74 and 78, and piping through the heat exchangers 12, 14, 20, 26, 32, 38, 44, and 76 can accommodate. In a preferred embodiment, all particles over ⅛" in diameter are removed. In a more preferred embodiment, all particles over 100 microns are removed. The feed stream 43 is pumped by feed pump 74 through brine warming chamber 48 as feed stream 45, and through heat exchanger 76, resulting in a warmed feed stream 49, which fills the brine warming chambers 13, 18, 24, 30, 36, and 42. Once all the brine warming chambers are full the feed pump 74 shuts off, isolating the feed tank 80 from the brine warming chambers. The brine warming chamber 13 is heated by the heater 10, producing steam stream 51, leaving a brine concentrate behind. Steam stream 51 passes into the steam condensing chamber 16 and is condensed, resulting in a condensate. Condensation heats brine warming chamber 18, producing steam stream 53, leaving a brine concentrate behind. Steam stream 53 passes into the steam condensing chamber 22 and is condensed, resulting in a condensate. Condensation heats brine warming chamber 24, producing steam stream 55, leaving a brine concentrate behind. Steam stream 55 passes into the steam condensing chamber 28 and is condensed, resulting in a condensate. Condensation heats brine warming chamber 30, producing steam stream 57, leaving a brine concentrate behind. Steam stream 57 passes into the steam condensing chamber 34 and is condensed, resulting in a condensate. Condensation heats brine warming chamber 36, producing steam stream 59, leaving a brine concentrate behind. Steam stream 59 passes into the steam condensing chamber 40 and is condensed, resulting in a condensate. Condensation heats brine warming chamber 42, producing steam stream 61, leaving a brine concentrate behind. Steam stream 61 passes into the steam condensing chamber 46 and is condensed, resulting in a condensate. Condensation heats brine warming chamber 48, warming the feed stream 45. The vacuum pump 33 and pressure regulators 21, 23, 25, 27, 29, and 31 reduce pressure in each of the brine warming chambers 13, 18, 24, 30, 36, and 42 to a pressure that allows the heater 10 or condensation of steam in the steam condensing chambers 16, 22, 28, 34, and 40, respectively, to boil the brine in the brine warming chambers 13, 18, 24, 30, 36, and 42.

In a preferred embodiment, the filter 84 is cleaned by backflush, sending the filtered material to the blackwater system.

In a preferred embodiment, concentrated brine 67 is removed from the brine warming chambers 13, 18, 24, 30, 36, and 42 after a batch is completed through valves 62, 64, 66, 68, 70, and 72, respectively, by pump 78 and is passed into a blackwater incinerator. The water remaining in the brine concentrate assists in transport of the blackwater into the incinerator, and the incinerator disposes of the solutes and remaining particulates. In an alternate embodiment, the brine concentrate is dumped into a typical waste disposal system.

In this embodiment, as a batch completes the condensate is removed as stream 63 and used to preheat the feed stream 47 of the next batch, resulting in a cooled condensate stream 65. In other embodiments, the preheating step is excluded.

Figure 2:
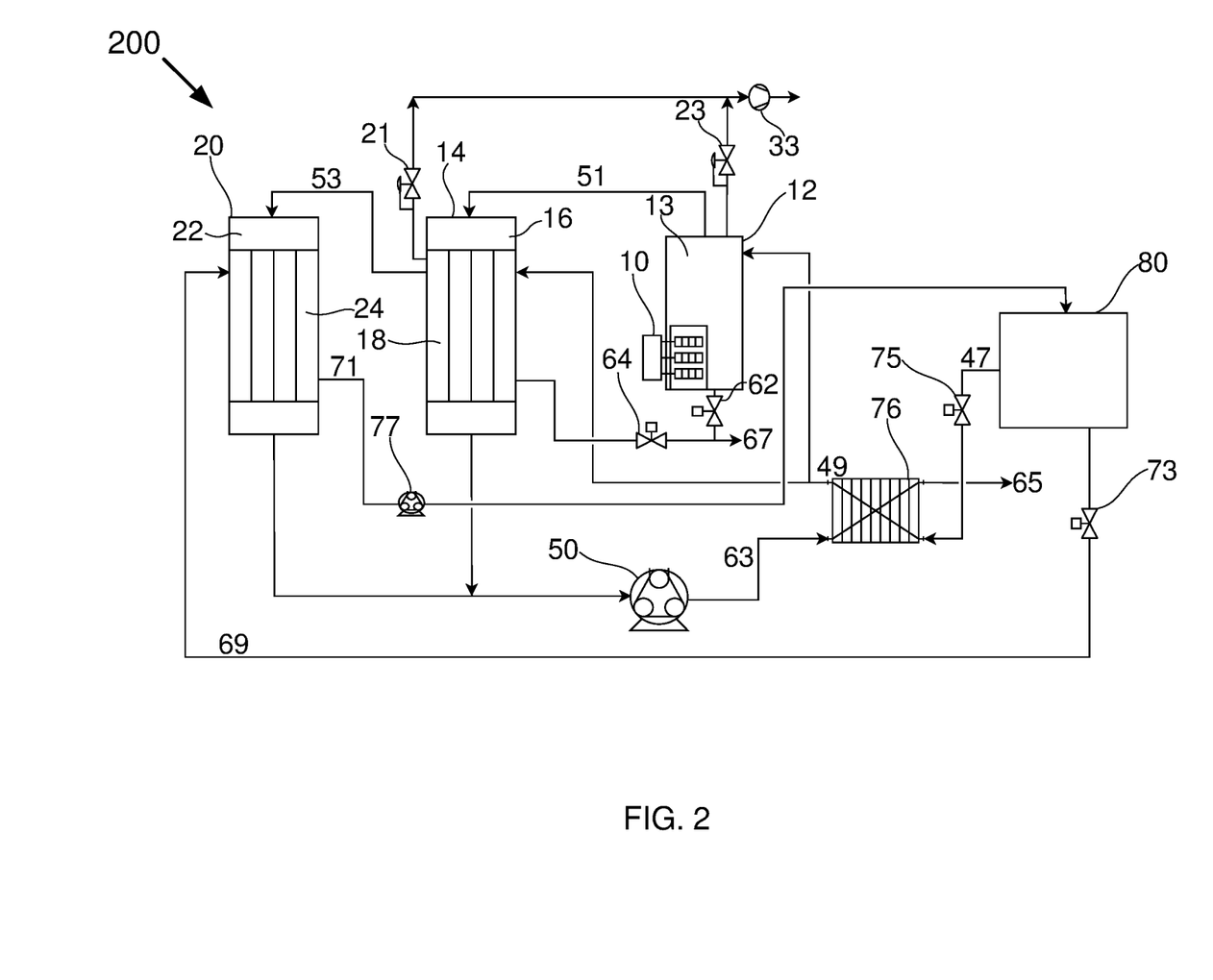
FIG. 2 is a block flow diagram showing a method for conducting batch multi-effect distillation.

FIG. 2 is a block flow diagram showing a method for conducting batch multi-effect distillation at 200 that may be used in one embodiment of the present invention. A multi-effect distillation system and peripherals are provided. This includes an electric heater 10, a first, a second, and a third heat exchanger 12, 14, and 20 in series, a feed tank 80, a preheating exchanger 76, isolation valves 73 and 75, discharge valves 62 and 64, discharge pump 77, condensate pump 50, vacuum pump 33, and pressure regulators 21 and 23. A feed stream 69 is passed from the feed tank 80 through the isolation valve 73 into the brine side 24 of the third heat exchanger 20. A feed stream 47 is passed from the feed tank 80 through the isolation valve 75 and is warmed across the preheating exchanger 76 to produce warmed feed stream 49, which is passed into the brine sides 13 and 18 of the first and second heat exchangers 12 and 14. The brine sides 13, 18, and 24 are isolated from the feed source by closing the isolation valves 73 and 75. The vacuum pump 33 and the pressure regulators 21 and 23 reduce the pressure in the brine side 13 and the brine side 18 of the first and second heat exchangers 12 and 14 to pressures P1 and P2, respectively. The pressures P1 and P2 are chosen such that heat provided by the heater or the steam stream 51, respectively, is sufficient to boil the feed streams. The electric heater 10 heats the brine side 13 of the first heat exchanger 12, producing a steam stream 51 and leaving behind a brine concentrate. The steam stream 51 passes into the steam side 16 of the second heat exchanger 14 where it condenses, resulting in a condensate. Condensation heats the brine side 18 of the second heat exchanger, producing steam stream 53, leaving a brine concentrate behind. The steam stream 53 passes into the steam side 24 of the third heat exchanger 20 where it condenses, resulting in a condensate. Condensation heats the brine side 24 of the third heat exchanger 20, resulting in a warmed feed stream 71 that is passed through discharge pump 77 into the feed tank 80 after the batch is completed. The brine concentrate from the first and second heat exchangers 12 and 14 is passed through discharge valves 62 and 64 and out of the system as a brine discharge 67. The condensate 63 from the second and third heat exchangers 14 and 20 is pumped by pump 50 through the preheating exchanger 76, warming the feed stream 47 of the next batch.

Figure 3:
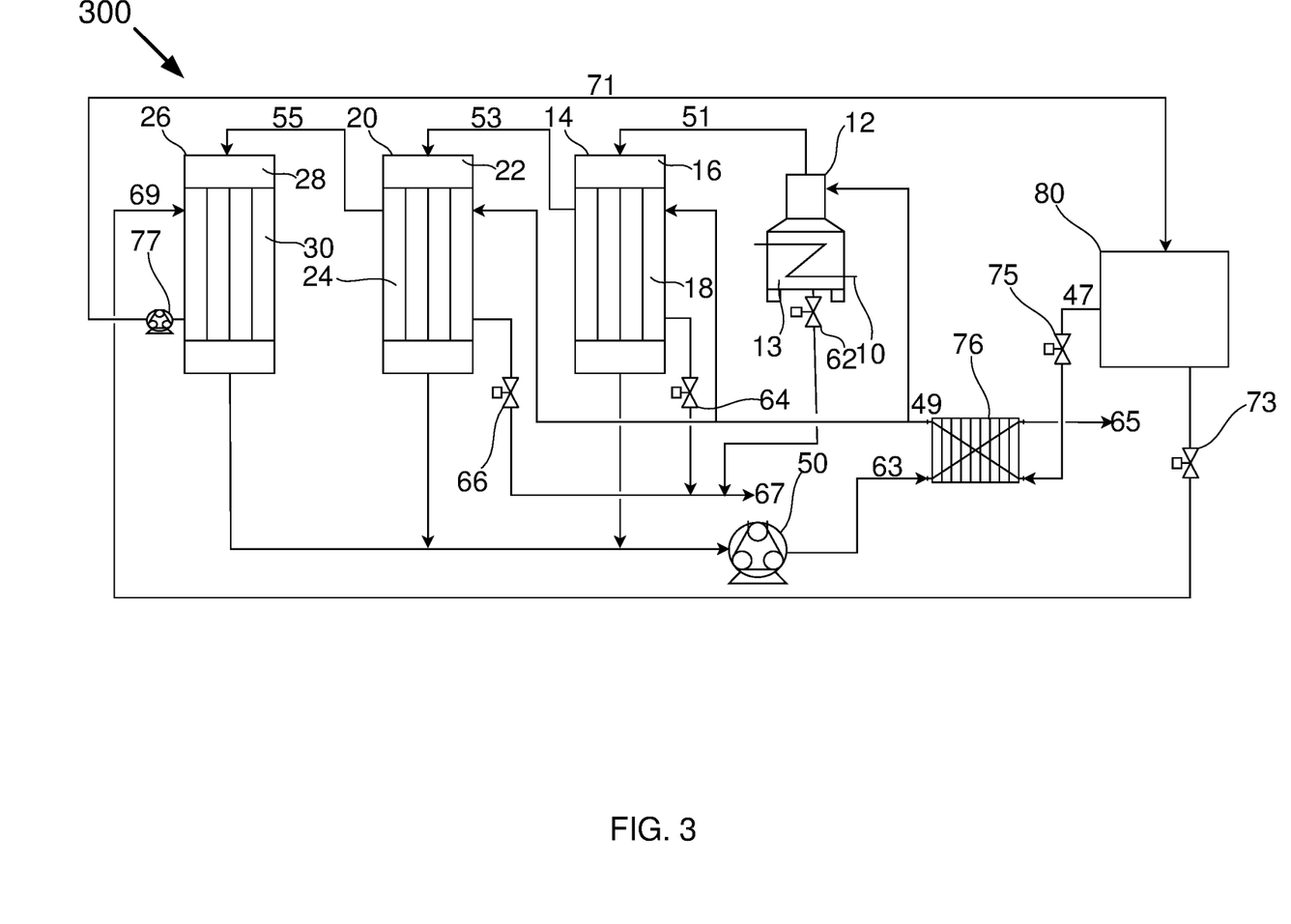
FIG. 3 is a block flow diagram showing a method for conducting batch multi-effect distillation.

FIG. 3 is a block flow diagram showing a method for conducting batch multi-effect distillation at 300 that may be used in one embodiment of the present invention. A multi-effect distillation system and peripherals are provided. This includes a burner 10, a first, a second, a third, and a fourth heat exchanger 12, 14, 20, and 26 in series, a feed tank 80, a preheating exchanger 76, isolation valves 73 and 75, discharge valves 62, 64, and 66, discharge pump 77, and condensate pump 50. Vacuum pumps and pressure regulators are not shown for clarity of drawing but would be included. A feed stream 69 is passed from the feed tank 80 through the isolation valve 73 into the brine side 30 of the fourth heat exchanger 20. A feed stream 47 is passed from the feed tank 80 through the isolation valve 75 and is warmed across the preheating exchanger 76 to produce warmed feed stream 49, which is passed into the brine sides 13, 18, and 24 of the first and second heat exchangers 12 and 14. The brine sides 13, 18, 24, and 30 are isolated from the feed source by closing the isolation valves 73 and 75. The vacuum pump and the pressure regulators reduce the pressure in the brine sides 13, 18, and 24 of the first, second, and third heat exchangers 12, 14, and 20 to pressures P1, P2, and P3, respectively. The pressures P1, P2, and P3 are chosen such that heat provided by the heater or the steam streams 51 and 53, respectively, is sufficient to boil the feed streams. The burner 10 heats the brine side 13 of the first heat exchanger 12, producing a steam stream 51 and leaving behind a brine concentrate. The steam stream 51 passes into the steam side 16 of the second heat exchanger 14 where it condenses, resulting in a condensate. Condensation heats the brine side 18 of the second heat exchanger, producing steam stream 53, leaving a brine concentrate behind. The steam stream 53 passes into the steam side 24 of the third heat exchanger 20 where it condenses, resulting in a condensate. Condensation heats the brine side 24 of the third heat exchanger 20, resulting in a warmed feed stream 71 that is passed through discharge pump 77 into the feed tank 80 after the batch is completed. The brine concentrate from the first and second heat exchangers 12 and 14 is passed through discharge valves 62 and 64 and out of the system as a brine discharge 67. The condensate 63 from the second and third heat exchangers 14 and 20 is pumped by pump 50 through the preheating exchanger 76, warming the feed stream 47 of the next batch.

Figure 4:
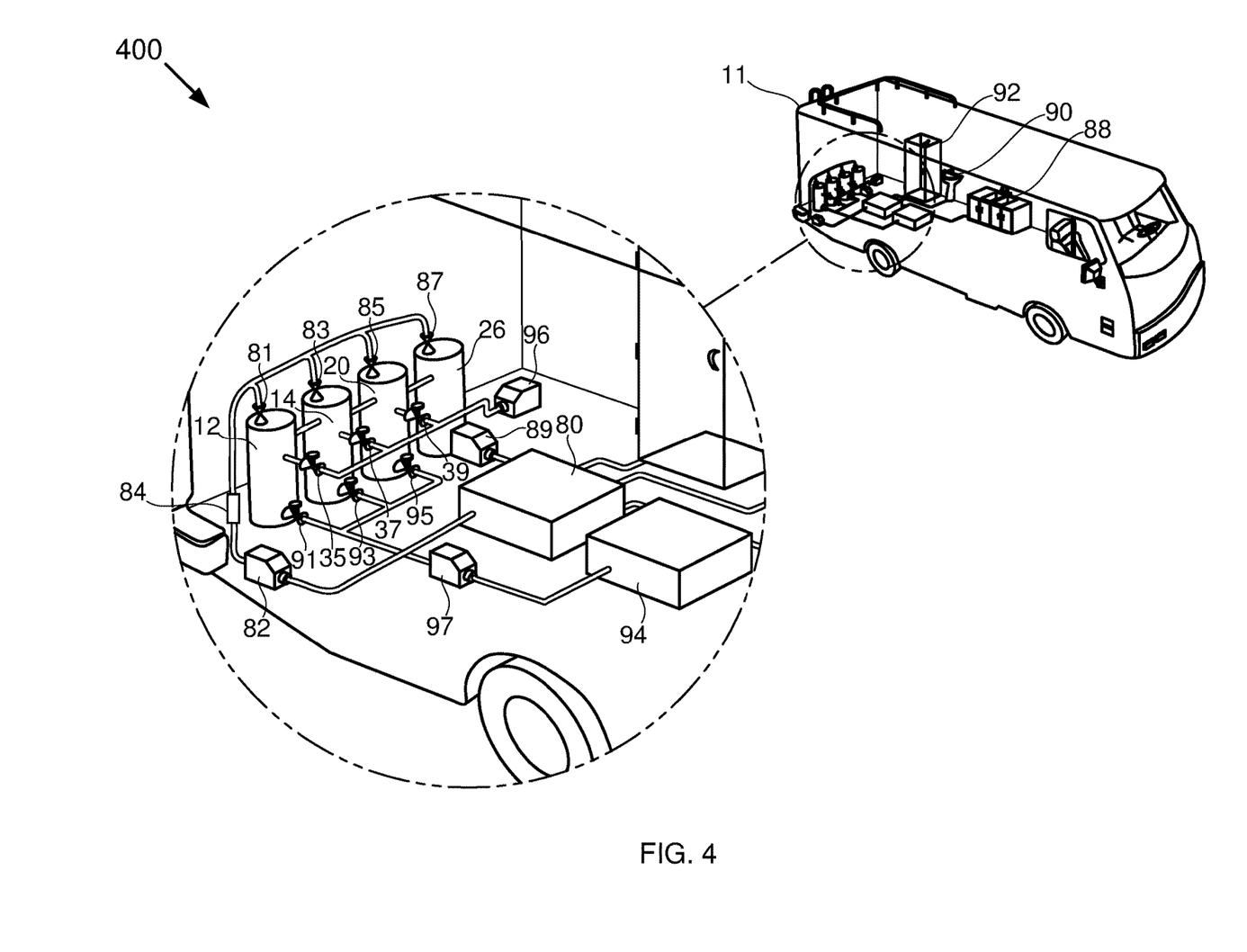
FIG. 4 is an isometric view of the interior of a recreational vehicle containing a system for conducting batch multi-effect distillation.

Now referring to FIG. 4, FIG. 4 is an isometric view of the interior of a recreational vehicle (RV) with a zoomed in view of a system for conducting batch multi-effect distillation at 400 that may be used in a preferred embodiment of the present invention. The system is shown at a larger scale compared to the RV than would be typical for clarity of drawings. The recreational vehicle 11 contains an electric heater inside a first heat exchanger 12, a series of heat exchangers 14, 20, and 26, and a feed source tank 80. Heat exchangers 14, 20, and 26 each have pressure regulators 35, 37, and 39 connected to a vacuum pump 96. The feed source tank 80 receives gray water from sinks 88 and 90 and a shower 92. A peristaltic pump 82 passes the gray water through a filter 84, through isolation valves 81, 83, 85, and 87, and into a brine side of the heat exchangers 12, 14, 20, and 26. The isolation valves 81, 83, 85, and 87 are then closed, isolating the heat exchangers 12, 14, 20, and 26 from the feed source tank 80. The brine side of the heat exchanger 12 is kept under a partial vacuum, P1. The electric heater heats up the brine side of the heat exchanger 12, boiling a portion of the water to form steam. The steam passes from the brine side of the heat exchanger 12 to a steam side of the heat exchanger 14, the steam condensing to condensate as it is cooled by heating up the brine side of the heat exchanger 14. The brine side of the heat exchanger 14 is kept under a partial vacuum, P2, and the heat from condensing the steam causes the brine to boil. The resultant steam passes from the brine side of the heat exchanger 14 to a steam side of the heat exchanger 20, the steam condensing to condensate as it is cooled by heating up the brine side of the heat exchanger 20. The brine side of the heat exchanger 20 is kept under a partial vacuum, P3, and the heat from condensing the steam causes the brine to boil. The resultant steam passes from the brine side of the heat exchanger 20 to a steam side of the heat exchanger 26, the steam condensing to condensate as it is cooled by heating up the brine side of the heat exchanger 26. The brine side of the heat exchanger 26 is kept at atmospheric pressure and the heat from condensing the steam causes the brine to be heated, but not boiled. The heated brine is passed back to the feed source tank 80 by pump 89, partially preheating the gray water. In a preferred embodiment, the concentrated brine remaining in the heat exchangers 12, 14, and 20 is disposed of by passing it through valves 91, 93, and 95 and by pump 97 to a blackwater tank 94. The blackwater is incinerated in a blackwater incinerator in the same recreational vehicle. In a preferred embodiment, the condensate produced can be further treated to produce potable water. In a more preferred embodiment, the condensate produced can be used directly as potable water without further treatment.

The pressure P1 is greater than the pressure P2 which is greater than the pressure P3. In a preferred embodiment, the vacuum brings the pressure P1 to between 10 and 14 psi, the pressure P2 to between 6 and 10 psi, and the pressure P3 to between 3 and 6 psi. In embodiments with more or less exchangers, the ranges are varied to allow for the heat provided by steam to each exchanger to be sufficient at the pressure to boil the brine.

Figure 5:
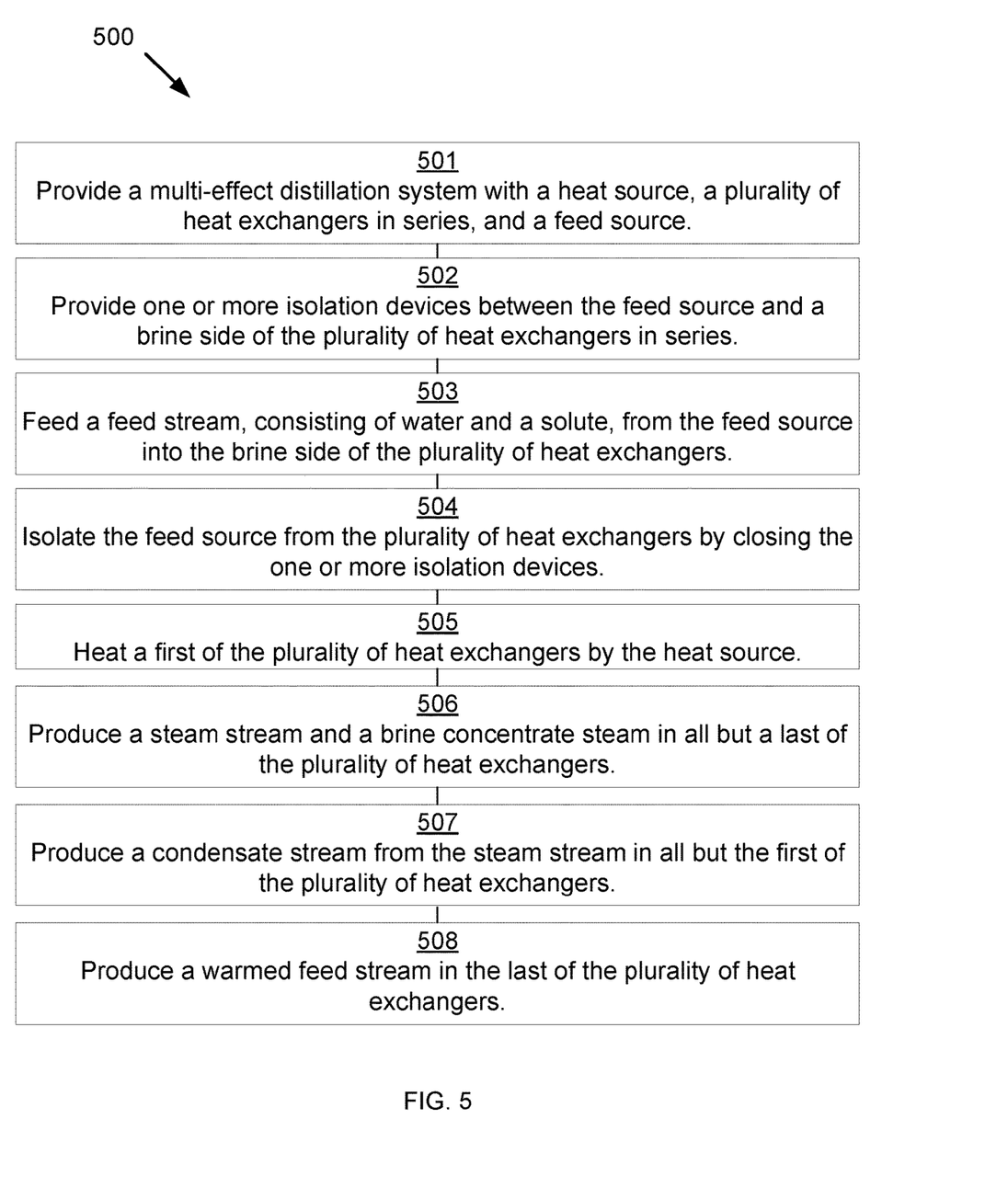
FIG. 5 is a block diagram showing a method for conducting batch multi-effect distillation.

FIG. 5 is a block diagram showing a method for conducting batch multi-effect distillation at 500 that may be used in one embodiment of the present invention. At 501, a multi-effect distillation system is provided with a heat source, a plurality of heat exchangers in series, and a feed source. At 502, one or more isolation devices is provided between the feed source and a brine side of the plurality of heat exchangers in series. At 503, a feed stream, consisting of water and a solute, is fed from the feed source into the brine side of the plurality of heat exchangers. At 504, the feed source is isolated from the plurality of heat exchangers by closing the one or more isolation devices. At 505, a first of the plurality of heat exchangers is heated by the heat source. At 506, a steam stream and a brine concentrate stream are produced in all but a last of the plurality of heat exchangers. At 507, a condensate stream is produced from the steam stream in all but the first of the plurality of heat exchangers. At 508, a warmed feed stream is produced in the last of the plurality of heat exchangers.

Figure 6:
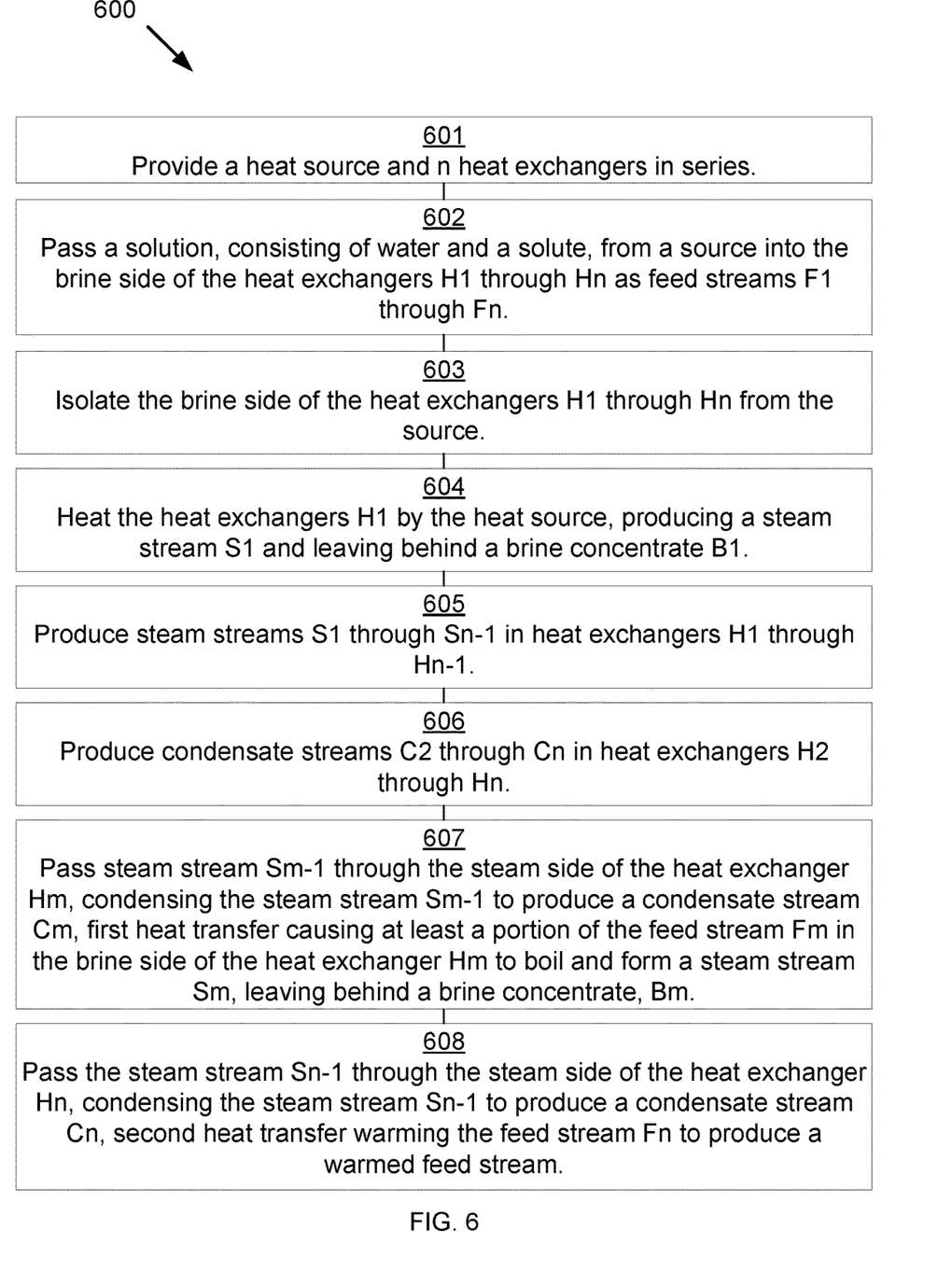
FIG. 6 is a block diagram showing a method for conducting batch multi-effect distillation.

FIG. 6 is a block diagram showing a method for conducting batch multi-effect distillation at 600 that may be used in one embodiment of the present invention. At 601, a heat source and n heat exchangers in series are provided. A heat exchanger H1 is a first heat exchanger and a heat exchanger Hn is an nth heat exchanger, n representing the number of heat exchangers. Each heat exchanger H1 through Hn has a brine side and a steam side. The brine side of the heat exchanger Hm−1 is in fluid communication with the steam side of the heat exchanger Hm, m representing numbers between 2 and n−1. At 602, a solution, consisting of water and a solute, is passed from a source into the brine side of the heat exchangers H1 through Hn as feed streams F1 through Fn. At 603, the brine side of the heat exchangers H1 through Hn are isolated from the source. At 604, the heat exchanger H1 is heated by the heat source, producing a steam stream S1 and leaving behind a brine concentrate B1. At 605, steam streams S1 through Sn−1 are produced in heat exchangers H1 through Hn−1. At 606, condensate streams C2 through Cn are produced in heat exchangers H2 through Hn. At 607, the steam stream Sm−1 is passed through the steam side of the heat exchanger Hm, condensing the steam stream Sm−1 to produce a condensate stream Cm, first heat transfer causing at least a portion of the feed stream Fm in the brine side of the heat exchanger Hm to boil and form a steam stream Sm, leaving behind a brine concentrate Bm. At 608, the steam stream Sn−1 is passed through the steam side of the heat exchanger Hn, condensing the steam stream Sn−1 to produce a condensate stream Cn, second heat transfer warming the feed stream Fn to produce a warmed feed stream.

In some embodiments, the feed stream is passed from the feed source by gravity. In other embodiments, active transport, such as pumping, is used.

In some embodiments, the brine concentrate stream is left in all but the last of the plurality of heat exchangers as an additional amount of the feed stream is added. The batch multi-effect distillation is again conducted, resulting in a greater solute concentration in the resultant brine concentrate stream.

In some embodiments, a first portion of the condensate stream is removed after the batch is over, leaving a second portion of the condensate stream to prevent fluid communication between air in a condensate stream discharge location and the plurality of heat exchangers.

The invention has been described with reference to various specific and preferred embodiments and techniques. Nevertheless, it is understood that many variations and modifications may be made while remaining within the spirit and scope of the invention.

What is claimed is:

1. A method for conducting batch multi-effect distillation comprising:
   providing a multi-effect distillation system comprising a heat source, a plurality of heat exchangers in series, and a feed source;
   providing one or more isolation devices between the feed source and a brine side of the plurality of heat exchangers in series;
   passing a feed stream, comprising water and a solute, from the feed source into the brine side of the plurality of heat exchangers;
   isolating the feed source from the plurality of heat exchangers by closing the one or more isolation devices;
   heating a first of the plurality of heat exchangers by the heat source;
   producing a steam stream and a brine concentrate stream in all but a last of the plurality of heat exchangers;
   producing a condensate stream from the steam stream in all but the first of the plurality of heat exchangers;
   producing a warmed feed stream in the last of the plurality of heat exchangers; and
   removing a first portion of the condensate stream after the batch is over and leaving a second portion of the condensate stream to prevent fluid communication between air in a condensate stream discharge location and the plurality of heat exchangers.

2. The method of claim 1, wherein the first of the plurality of heat exchangers is a furnace or an electric heater.

3. The method of claim 1, wherein the one or more isolation devices are valves or pumps.

4. The method of claim 1, wherein the feed stream is gray water.

5. The method of claim 1, wherein the feed stream is passed from the feed source by gravity.

6. The method of claim 1, further comprising leaving the brine concentrate stream in all but the last of the plurality of heat exchangers as an additional amount of the feed stream is added and batch multi-effect distillation is conducted, resulting in a greater solute concentration in the resultant brine concentrate stream.

7. The method of claim 1, wherein producing the steam stream and the brine concentrate stream is accomplished by a combination of heat across the heat exchanger and vacuum, with the vacuum increasing in the plurality of heat exchangers in series.

8. A system for conducting batch multi-effect distillation comprising:
   a multi-effect distillation system comprising a heat source, a plurality of heat exchangers in series, and a feed source;

one or more isolation devices installed between the feed source and a brine side of the plurality of heat exchangers;

the feed source configured to pass a feed stream, comprising water and a solute, to the brine side of the plurality of heat exchangers;

the one or more isolation devices configured to isolate the feed source from the plurality of heat exchangers after the feed stream is passed;

all but a last of the plurality of heat exchangers configured to produce a brine concentrate stream and a steam stream;

all but a first of the plurality of heat exchangers configured to produce a condensate stream from the steam stream;

the last of the plurality of heat exchangers configured to produce a warmed feed stream; and the heat source configured to heat the first of the plurality of heat exchangers;

further comprising valves or pumps configured to remove a first portion of the condensate stream after the batch is over and leave a second portion of the condensate stream to prevent fluid communication between air in a condensate stream discharge location and the plurality of heat exchangers.

9. The system of claim 8, wherein the first of the plurality of heat exchangers is a furnace or an electric heater.

10. A waste treatment system for a recreational vehicle or residential dwelling, comprising the system of claim 8.

11. The system of claim 8, wherein the feed stream is gray water.

12. The system of claim 8, wherein the feed source is further configured to leave the brine concentrate stream in all but the last of the plurality of heat exchangers as an additional amount of the feed stream is added and batch multi-effect distillation is conducted, resulting in a greater solute concentration in the resultant brine concentrate stream.

13. The method system of claim 8, wherein the plurality of heat exchangers are configured to produce the steam stream and the brine concentrate steam by a combination of heat across the heat exchanger and vacuum, with the vacuum increasing in the plurality of heat exchangers in series.

14. A method for conducting batch multi-effect distillation comprising:

providing a heat source and n heat exchangers in series, a heat exchanger $H1$ being a first heat exchanger and a heat exchanger $Hn$ being an nth heat exchanger, n representing the number of heat exchangers, wherein each heat exchanger $H1$ through $Hn$ comprises a brine side and a steam side, and wherein the brine side of the heat exchanger $Hm-1$ is in fluid communication with the steam side of the heat exchanger $Hm$, m representing numbers between 2 and $n-1$;

passing a solution, comprising water and a solute, from a solution source into the brine side of the heat exchangers $H1$ through $Hn$ as feed streams $F1$ through $Fn$;

isolating the brine side of the heat exchangers $H1$ through $Hn$ from the solution source;

heating the heat exchanger $H1$ by the heat source, producing a steam stream $S1$ and leaving behind a brine concentrate $B1$;

producing steam streams $S1$ through $Sn-1$ in heat exchangers $H1$ through $Hn-1$;

producing condensate streams $C2$ through $Cn$ in heat exchangers $H2$ through $Hn$;

passing the steam stream $Sm-1$ through the steam side of the heat exchanger $Hm$, condensing the steam stream $Sm-1$ to produce a condensate stream $Cm$, first heat transfer causing at least a portion of the feed stream $Fm$ in the brine side of the heat exchanger $Hm$ to boil and form a steam stream $Sm$, leaving behind a brine concentrate $Bm$;

passing the steam stream $Sn-1$ through the steam side of the heat exchanger $Hn$, condensing the steam stream $Sn-1$ to produce a condensate stream $Cn$, second heat transfer warming the feed stream $Fn$ to produce a warmed feed stream; and removing a first portion of the condensate stream after the batch is over and leaving a second portion of the condensate stream to prevent fluid communication between air in a condensate stream discharge location and the plurality of heat exchangers.

15. The method of claim 14, further comprising applying a vacuum $V1$ to $Vn-1$ to the brine side of the heat exchangers $H1$ through $Hn-1$, wherein vacuum $V1$ through $Vn-1$ increases in sequence, with a highest vacuum in $Hn-1$.

16. The method of claim 14, further comprising passing the warmed feed stream to the solution source.

17. The method of claim 14, further comprising passing the brine concentrate $B1$ through $Bn-1$ out of the heat exchangers $H1$ through $Hn-1$.

18. The method of claim 14, wherein $H2$ through $Hn$ are phase-change heat exchangers.

* * * * *